G. M. Rhoades.
Tassel Trimmer.

N°. 1,645.  
32,649.

Patented Jun. 25, 1861.

Witnesses.  
U. N. Rhoades  
F. G. Shepardson

Inventor.  
Geo. M. Rhoades

UNITED STATES PATENT OFFICE.

GEO. M. RHOADES, OF HAMILTON, NEW YORK.

IMPROVEMENT IN MACHINES FOR TRIMMING TEASELS.

Specification forming part of Letters Patent No. 32,649, dated June 25, 1861.

*To all whom it may concern:*

Be it known that I, GEORGE M. RHOADES, of Hamilton, in the county of Madison and State of New York, have invented a new and useful Implement or Device for Trimming Teasels; and I do hereby declare that the following is a full, clear, and exact description of the construction and operation of the same, reference being had to the annexed drawings, making a part of this specification, in which—

Figure 1:
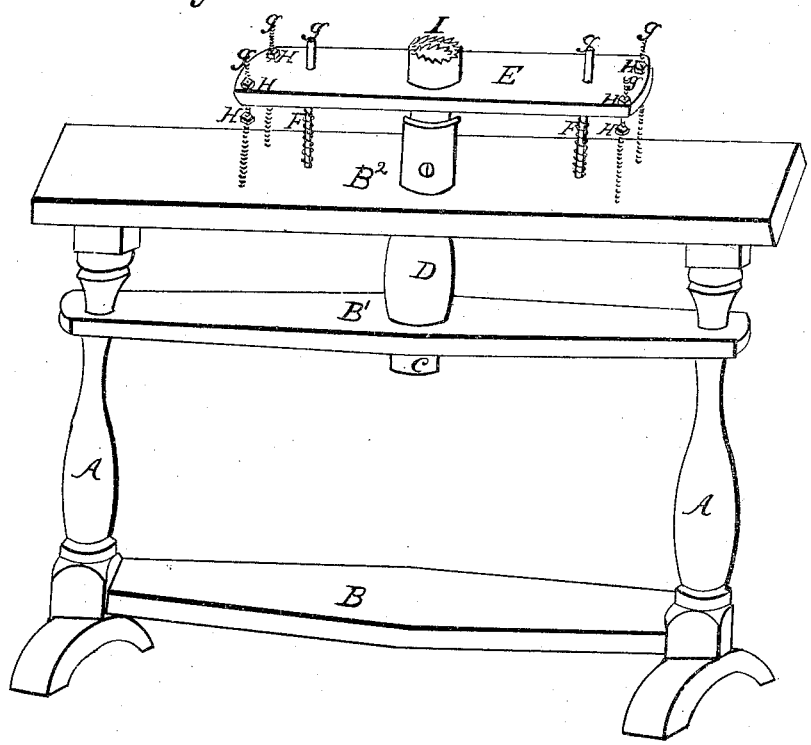
Figure 2:
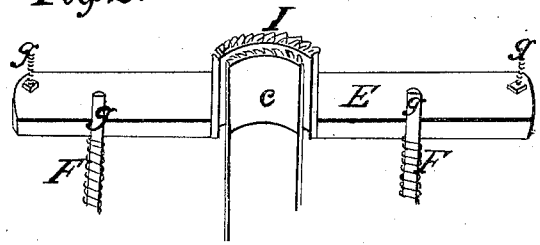

Figure 1 is a perspective view. Fig. 2 is a transverse view of the cylinder C, tube I, and bed-plate E.

My invention consists in the employment and use of mechanism, which will be presently described, for the purpose of removing the thick leaves immediately at the base of the burr of teasels in a very rapid and more perfect manner than by any process heretofore employed. The teasel is a plant having burrs at its upper end, and extensively used in manufacturing establishments for raising the nap or fine fiber on the surface of cloth. I have experimented several years to effect this object, and the contrivances used, though varying in construction, are essentially the same in principle, operation, and effect, and I therefore deem it unnecessary to describe them all in this specification, but will confine myself to a description of the contrivance I have in use, and which I have found to operate with perfect satisfaction.

The main frame of my machine, which may be made of wood or metal, consists of two uprights (marked in the drawings A A) and three horizontal plates (marked B, B', and B².) The above parts are framed or connected together in any well-known manner. The size of a machine—that is to say, the framework—which I have found to work well in practice may be two feet in length and eighteen or twenty inches in height. Through the plates marked B' and B², I make a round opening one inch, or thereabout, in diameter. Into said opening I place a metallic tube. (Shown at C.) This tube has teeth somewhat resembling those of a saw. Their number I do not regard of much importance. There may be one or more, or a cutting-blade.

The tube above described is surrounded by a drum, (marked D.) This drum is intended to receive a belt. Gears, however, may be substituted. By either a rapid rotary motion may be communicated to tube C.

E represents what I term a "bed-plate," adjustable upon springs F F, and supported laterally by upright rods $g\ g\ g\ g\ g$.

H represents check-nuts, above and below bed-plate E.

I represents a tube with a serrated end. Said tube passes through bed-plate E. This tube, when adjusted for operation, is placed outside of tube C, and in near proximity to the outer surface thereof. The upper end of tube I is slightly elevated above tube C when not acted upon, and held in that position by springs F, but when acted upon by a slight pressure may be depressed below the cutting-edge of tube C.

The mode of trimming is as follows, viz: The operator takes the burr of the teasel in his hand and drops or places the stem in tube C, and gives to said teasel a slight pressure, by means whereof the outer tube, I, is depressed below the inner tube, C. When in this position, the inner tube, C, by means of a rapid rotary motion and its cutting-teeth the angles of which are inclined in a different direction from those upon the outer tube, I, as clearly shown in the drawings, cuts off the leaves, as hereinbefore mentioned. The serrated end of tube I holds the leaves in position to be acted upon by the cutters on tube C.

What I claim, and desire to secure by Letters Patent, is—

1. The employment of a revolving tube, C, provided with one or more teeth, as described, and for the purposes set forth.

2. Surrounding tube C with an adjustable outer tube, I, substantially in the manner and for the purposes set forth.

3. Retaining the outer tube, I, at any desired degree of elevation by means of check-nuts H and springs F, in combination with rods $g$, substantially as represented and described.

In testimony whereof I have hereunto signed my name before two witnesses.

GEORGE M. RHOADES.

Witnesses:
   A. W. MORSE,
   S. C. TABER.